July 28, 1959  D. W. YOUNG, JR  2,897,491
PHASE SATURABLE TRANSDUCER
Filed Jan. 22, 1957
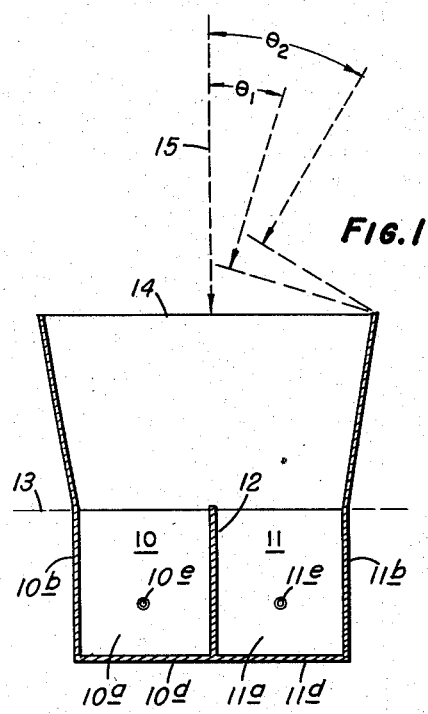
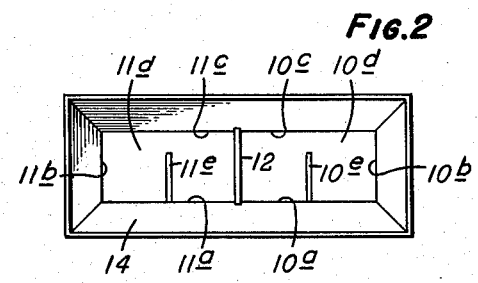
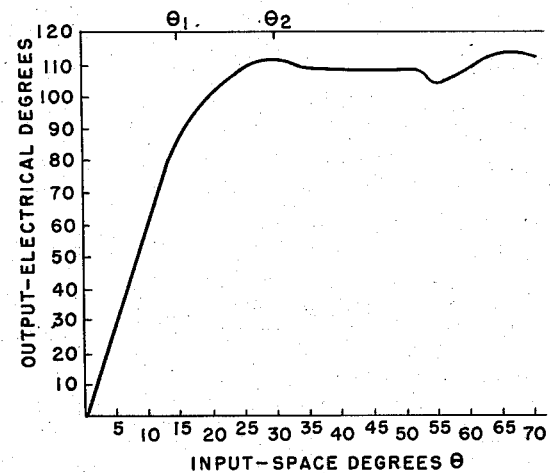
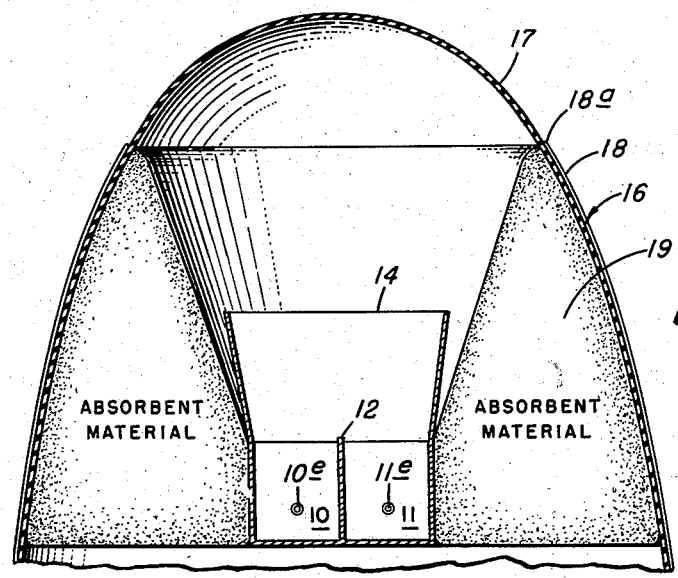
INVENTOR.
David W. Young Jr.
BY
ATTORNEY United States Patent Office 2,897,491
Patented July 28, 1959

2,897,491

PHASE SATURABLE TRANSDUCER

David Wilbur Young, Jr., Van Nuys, Calif., assignor to Bendix Aviation Corporation, North Hollywood, Calif., a corporation of Delaware Application January 22, 1957, Serial No. 635,480

8 Claims. (Cl. 343—100)

This invention relates broadly to directive transducer structures responsive to space waves such as, for example, electromagnetic (radio) waves, and acoustic waves in air or water. It relates more specifically to multiple transducer structures which produce a plurality of output waves of relative phase dependent upon the direction of approach of the space waves.

It is well known that if two transducers are juxtaposed side by side with their receiving ends or faces in a common frontal plane, space waves approaching from direction normal to the frontal plane (zero space angle) impinge on both transducers simultaneously (in phase) and the output of the two transducers are in phase; but if the space angle is such that the wave front impinges on one transducer before the other, the outputs are out of phase. The phase difference between the outputs is dependent upon the space angle, the wave length of the space waves and the lateral spacing of the transducers. If the space waves are short relative to the transducer spacing, a small change in space angle can produce a large change in phase angle. This may be desirable in the respect that it provides high sensitivity. It can be very undesirable with previously known structures because the phase angle reverses at 180°, and phase differences of 360° or multiples thereof are indistinguishable from each other and from zero phase shift. Hence a measured output phase may correspond to more than one phase angle and is therefore ambiguous.

An object of the invention is to prevent the aforementioned ambiguous results while retaining high sensitivity.

Another object is to provide a system of the type discussed in which the output phase varies with the space angle up to a desired value below that at which ambiguity can occur and then remains constant despite further changes in the space angle. This is referred to as phase saturation.

Phase saturation is obtained in accordance with the present invention by providing shielding means external of a multiple transducer assembly and extending forwardly of the frontal plane to intercept incoming waves of space angles exceeding a cut-off value. Waves of greater space angle may still reach the transducer by refraction around the edge of the shield, but all such refracted waves impinge on the transducers at the cut-off angle, so that the apparent space angle remains constant, and the phase angle between the outputs of the two transducers remains constant. It will be understood that the amplitude of the waves reaching the transducers by refraction may be substantially less than that of the waves reaching the transducer directly (at angles less than the cut-off value), but this is immaterial where only the phase difference is utilized to determine direction.

A full understanding of the invention may be had from the following detailed description with reference to the drawing in which:

Fig. 1 is a schematic diagram showing a radio wave transducing structure incorporating the invention, the view being taken in horizontal section.

Fig. 2 is a front end view of the structure of Fig. 1.

Fig. 3 is a graph showing the electrical characteristics of the structure of Figs. 1 and 2.

Fig. 4 shows a modification of the structure of Fig. 1.

Figs. 1 and 2 show a radio wave transducer consisting of a pair of juxtaposed waveguides 10 and 11 having a common side wall 12 and separate side walls $10a$, $10b$, $10c$ and $11a$, $11b$, and $11c$ respectively. The waveguides are shown of minimum effective length with closed rear ends $10d$ and $11d$, and with the usual probes $10e$ and $11e$, extending thereinto through the walls $10a$ and $11a$, in which electrical waves are generated in response to received radio waves and vice versa. It is to be understood that the particular transducer structure so far described is old and merely represents one of many forms that can be used. For the purpose of the present invention it is merely necessary that the transducers have their effective space wave receiving elements in a common frontal plane indicated in Fig. 1 by the plane 13 defining the open front faces or ends of the waveguides 10 and 11.

The invention resides in the combination with the two transducers, whatever their construction, of a shielding structure for preventing direct impingement of received space waves on the transducers when the angle of incidence of the waves exceed a desired value. In Fig. 1 the shielding structure comprises a four-sided, flared metal horn 14 continuous with the outer walls of the two waveguides 10 and 11 and extending forwardly beyond the frontal plane 13.

A structure in accordance with Fig. 1 was constructed having the following dimensions:

| | Inches |
|---|---|
| Vertical width of each waveguide | 1½ |
| Horizontal width of each waveguide | 3 |
| Length of each waveguide approximately | 3¼ |
| Axial length of horn | 4 |
| Horizontal width of horn at front end | 6⅞ |
| Vertical width of horn at front end | 3 |

This structure was tested by exposing it to radio waves of a frequency of 3000 megacycles (wave length about four inches) impinging on it at different space angles $\theta$ to the median plane 15, and the phase difference between the potentials generated in the probes $10e$ and $11e$ was measured. The results are shown in Fig. 3.

It will be observed that for space angles (angles of incidence) from 0° to about 15° ($\theta_1$) the phase difference between the output potentials increased substantially linearly from 0° to about 85°, then increased at a lessening rate to a maximum of about 110° at a space angle of 30° ($\theta_2$) and remained substantially constant as the space angle was further increased. Although Fig. 3 covers a range of space angles only up to 70°, phase saturation obtains at all higher angles at which any apreciable signal can be received. Hence the variation in phase angle from 0° to saturation occurs only when received waves are within the space angle $\theta_2$ on either side of the medium plane, and no ambiguity can result.

On the other hand, in a prior art structure similar to Fig. 1 but without the horn 14, the output phase difference would continually increase to a maximum of 270 electrical degrees at a space angle of 90°. Since the indication of a phase meter for any phase difference in the range 0° to 90° is identical with that for a phase difference in the range 90°–180°, ambiguity results.

The invention permits the elimination of ambiguities without decreasing high resolution, that is, a large change in phase output in response to a small change in space angle over the useful range of 0°–$\theta_2$° as shown in Fig. 3. Ambiguities can be prevented with old transducer structures by positioning two transducers so close together that the effective spacing is less than a quarter wave length of the space wave received, but in such case the phase reading for a space angle of 90° would be less than 90 electrical degrees, whereas Fig. 3 shows a phase reading of 90° for a space angle of only about 16°. In other words the present invention eliminates ambiguities without reducing resolution.

Another advantage of the invention is limitation of the maximum phase difference in the output to the useful range of a phase detecting equipment used therewith. Problems are involved in designing phase indicating equipment responsive to phase shifts exceeding 90° without ambiguity.

In the present structure, phase saturation results at space angles exceeding a cut-off value because space waves reach the transducers by refraction around the front edge of the horn 14, and hence their apparent direction remains constant.

The cut-off value can be varied by varying the length and flare of the horn 14. The resolution can be varied by varying the spacing between the transducers. Of course, the closeness of the transducers is limited by their dimensions, but they can be spaced apart to obtain higher resolutions and need not be in contact as shown.

When the transducers are waveguides, as shown, desired changes in characteristics can sometimes be effected by small changes in the length of the common wall 12.

Improvement can sometimes be obtained by a secondary shield. Thus, Fig. 4 shows the structure of Fig. 1 mounted in a radome 16 having a continuous wall 17 of non-conducting low loss material and a shielding conductive wall 18 which terminates at a front edge 18a in front of the frontal plane of the transducers, so that radio waves approaching at a high space angle reach the transducers only by refraction around the edge 18a. It may be desirable, with a shield of the type of shield 18 which extends rearwardly past the transducers in laterally spaced relation thereto, to provide wave-absorbent material 19 on its inner surface to reduce reflection therefrom.

It is to be understood that the invention can be practiced with a shield of the type of shield 18 alone without the shield 14 of the horn type, although the latter may be most practicable. The essence of the present invention is the combination of a plurality of transducers with a common shield limiting the angle at which space waves can impinge on the transducers.

Although for the purpose of explaining the invention, a particular embodiment thereof has been shown and described, obvious modifications will occur to a person skilled in the art, and I do not desire to be limited to the exact details shown and described.

I claim:

1. In space wave receiving apparatus responsive to space waves impinging thereon to generate two separate electrical waves of relative phase dependent upon the direction of approach of the received space waves to said apparatus: a pair of transducers for converting space waves into electrical waves, said transducers being positioned side by side in a common frontal plane and symmetrically disposed on opposite sides of a common longitudinal median plane perpendicular to said frontal plane whereby the respective electrical waves generated thereby in response to a space wave differ in phase increasingly with the angle of the space wave to said median plane; and means for limiting the said phase deviation comprising shielding means generally parallel to said median plane and laterally beyond said transducers and extending from a front edge positioned in front of said frontal plane rearwardly at least to said frontal plane, whereby space waves approaching said apparatus at angles of incidence exceeding a predetermined value reach said transducers by refraction around said front edge of said shielding means and impinge on said transducers at a constant angle determined by the position of said front edge relative to said faces.

2. Apparatus according to claim 1 in which said pair of transducers comprises a pair of waveguides having open front ends in said frontal plane.

3. Apparatus according to claim 2 in which said shielding means comprises a wall opaque to said space waves extending forwardly from the front edge of that portion of one of said waveguides most remote from said median plane.

4. Apparatus according to claim 3 including a second wall extending from the front edge of that portion of the other waveguide most remote from said one waveguide said two walls being symmetrically dimensioned and positioned on opposite sides of said longitudinal median plane between said transducers.

5. Apparatus according to claim 4 including additional wall means joining adjacent longitudinal edges of said two walls and forming therewith a horn.

6. Apparatus according to claim 1 in which said shielding means comprises a single horn extending forwardly from said frontal plane and feeding into both said transducers.

7. Apparatus according to claim 1 in which said shielding means comprises a peripheral wall surrounding both said transducers and extending forwardly beyond said frontal plane.

8. In space wave receiving apparatus responsive to space waves impinging thereon to generate two separate electrical waves of relative phase dependent upon the direction of approach of the received space waves to said apparatus: a pair of transducers for converting space waves into electrical waves, said transducers being positioned side by side in a common frontal plane and symmetrically disposed on opposite sides of a longitudinal median plane perpendicular to said frontal plane whereby the respective electrical waves generated thereby in response to a space wave differ in phase increasingly with the angle of the space wave to said median plane, the effective lateral spacing of said transducers exceeding the quarter wavelength of said space waves whereby a change in said angle of incidence of 90° produces a phase change exceeding 90°; and means for limiting the said phase deviation comprising a single shielding means common to both said transducers and generally parallel to said median plane and laterally beyond said transducers and extending from a front edge positioned in front of said frontal plane rearwardly at least to said frontal plane, whereby space waves approaching said apparatus at angles exceeding a predetermined value reach both said transducers by refraction around said front edge of said shielding means and impinge on said transducers at a constant angle determined by the position of said front edge relative to said faces, said position of said front edge being such that said constant angle is less than that angle at which said phase change materially exceeds 90°.

References Cited in the file of this patent

UNITED STATES PATENTS

| | | |
|---|---|---|
| 1,588,358 | Hahnemann | June 8, 1926 |
| 1,792,634 | Ely | Feb. 17, 1931 |
| 2,751,586 | Riblet | June 19, 1956 |